(12) United States Patent  (10) Patent No.: US 7,546,862 B2
Moon et al.  (45) Date of Patent: Jun. 16, 2009

(54) NON-PNEUMATIC VEHICLE TIRE

(75) Inventors: Michael Moon, Chicago, IL (US); Morris Corn, Boca Raton, FL (US)

(73) Assignee: New Tech Tire LLC, Boca Raton, FL (US)

( * ) Notice: Subject to any disclaimer, the term of this patent is extended or adjusted under 35 U.S.C. 154(b) by 195 days.

(21) Appl. No.: 11/123,808

(22) Filed: May 6, 2005

(65) Prior Publication Data

US 2006/0249236 A1    Nov. 9, 2006

(51) Int. Cl.
B60C 7/00    (2006.01)
(52) U.S. Cl. ...................... 152/276; 152/270
(58) Field of Classification Search .......... 152/246–247, 152/253, 256, 258–260, 267, 269–270, 273, 152/275–277
See application file for complete search history.

(56) References Cited

U.S. PATENT DOCUMENTS

| 1,083,798 | A | * | 1/1914 | Butts | ............................ 152/156 |
| 1,113,036 | A | | 10/1914 | Mitchell | |
| 1,160,508 | A | * | 11/1915 | Hay | ............................ 152/259 |
| 1,295,266 | A | | 2/1919 | Bullard | |
| 1,391,985 | A | * | 9/1921 | Siino | ............................ 152/276 |
| 1,412,682 | A | | 4/1922 | Gerome | |
| 1,471,580 | A | | 10/1923 | Walton | |
| 1,610,238 | A | | 12/1926 | Benson | |
| 1,625,679 | A | | 4/1927 | Pearson | |
| 1,687,206 | A | * | 10/1928 | Hatvani | ...................... 152/276 |
| 2,435,625 | A | | 2/1948 | Garcia | |
| 4,459,167 | A | | 7/1984 | Markow et al. | |
| 5,050,656 | A | | 9/1991 | Ho | |
| 6,196,289 | B1 | | 3/2001 | Yoshioka | |
| 6,374,887 | B1 | * | 4/2002 | Subotics | ...................... 152/276 |
| 6,640,859 | B1 | | 11/2003 | Laurent et al. | |
| 6,994,135 | B2 | * | 2/2006 | Delfino et al. | .............. 152/276 |
| 2003/0226630 | A1 | | 12/2003 | Delfino et al. | |

FOREIGN PATENT DOCUMENTS

HU           223 293 B1    5/2004
WO        WO 00/37269      6/2000

* cited by examiner

*Primary Examiner*—Jason R Bellinger
(74) *Attorney, Agent, or Firm*—DLA Piper LLP (US); Jennifer E. Lacroix

(57) ABSTRACT

A non-pneumatic tire for a vehicle featuring a body of elastic material and having a circumferentially-extending crown portion featuring a running surface and circumferentially-extending sidewalls joined to the crown portion. The side walls terminate in circumferentially-extending beads which are adapted to engage the rim of a vehicle wheel. A number of radially-extending and circumferentially-spaced compound-curve springs made of a composite material are at least partially embedded within the crown portion and the sidewalls. The curved springs have ends terminating within the beads of the tire body. A circumferentially-extending belt constructed of a high-strength and low stretch material is positioned radially outside of the compound-curve springs.

14 Claims, 7 Drawing Sheets

NON-PNEUMATIC VEHICLE TIRE

BACKGROUND OF THE INVENTION

The present invention generally relates to vehicle tires and, more specifically, to a non-pneumatic vehicle tire.

Tires currently used on vehicles are generally pneumatic tires. With such tires, internal air pressure is necessary to carry the load acting on the tires. Vehicle tires working with internal air pressure function well in practice, however, they do suffer from significant drawbacks. Such drawbacks include complex structural designs as well as safety issues in the event of a puncture during their use on public roads.

Airless or non-pneumatic tire designs exist in the prior art. For example, U.S. Pat. No. 1,610,238 to Benson discloses an airless vehicle tire in which arcuate or C-shaped springs are disposed radially around the tire. A ring-shaped wire spring running around the circumference of the tire is threaded through loops formed in the portions of the C-shaped springs situated in the crown portion of the tire. The ends of the C-shaped springs are bent into rings in the bead portions of the tire. A pair of ring-shaped springs, each of a diameter identical to that of the bead of the tire, are threaded one each through the rings on the ends of the C-shaped springs.

Similar radially-situated leaf springs are described in U.S. Pat. No. 1,113,036 to Mitchell. The C-shaped leaf springs in this solution, however, do not contain a loop on the crown portion of the tire.

According to U.S. Pat. No. 1,471,580 to Walton, springs prepared from wires of circular cross-section are formed in two symmetrically situated semi-circles and disposed radially within the tire so that a tunnel-like arrangement is formed. Both ends of each spring are provided with a fold-back in the form of a circle. Steel wires, which play the role of the bead-rings, are threaded through the circle-shaped foldbacks. In the circumferential direction, the radial springs are tied-up in pairs by a reinforcement in the crown portion of the tire. In this solution, the tire is pressurized to ensure the necessary loadability.

The disadvantage of the above prior art tires is that each is unsuitable for carrying loads over approximately 450 lbs. as the crown portions of the springs of each become flat, and, due to the large deformation, the springs fatigue and break. Another drawback of the vehicle tires of such construction is that they can be used only on vehicles with low traveling speeds (maximum 25-35 mph). In case of larger load or speed, the temperature of the vehicle tires significantly exceeds the acceptable temperature limit of 175-195° F. due to large spring deformations. As a consequence, the rubber material ages very quickly becoming thereby unsuitable for further use. A further disadvantage of the above prior art tires is the small side stability characteristic for their high profiles. This makes their safe operation in today's high-speed vehicles impossible.

The object of commonly assigned U.S. Pat. No. 6,374,887 to Subotics is a non-pneumatic vehicle tire reinforced by arch-shaped leaf springs, preferably made of a material such as steel, that are radially disposed within the tire. The tire features a crown portion containing the running surface and two side walls joined to the crown portion via shoulder portions. The two sidewalls end in beads which are clamped into a wheel rim. The crown portion, sidewalls and the beads are kept together by ribs made of an elastic material, which are supported by the arched leaf springs. The ends of the leaf springs are embedded flexibly into the beads, and the whole vehicle tire is mounted onto the wheel rim in a pre-stressed state.

A disadvantage of the non-pneumatic tire of the Subotics '887 patent, however, is that the strengthening ribs slip on the leaf springs during functioning, since the leaf springs are not built into the rubber body of the tire. The friction thus generated results in heat generation. A consequence of this is a significant heating-up of the tire during use. Furthermore, owing to the flexible embedding of the leaf spring ends into the beads, the tire beads also heat up significantly during operation due to the large deformation of the tires. In addition, under a high loading of the tires, the spring ends are pressed into the rubber material of the beads. As a result, the bead ends of the springs move away from each other and fold-like peak deformations are generated on the crown portion of the springs. These peak deformations result in breaking of the springs after only a short time of operation.

Accordingly, it is an object of the present invention to provide a non-pneumatic vehicle tire of high wear resistance, loadability, speed and side stability, eliminating, or at least reducing, the above disadvantages of known vehicle tires.

These and other objects and advantages will be apparent from the following specification.

SUMMARY OF THE INVENTION

The present invention is directed to a non-pneumatic tire for vehicles. The invention is based on the recognition that the disadvantages of known vehicle tires with springs originate mainly from the shape, material and arrangement of the leaf springs and from the mode of their joining with the rubber body of the tires.

The vehicle tire of the present invention features a body made of an elastic material, preferably rubber or polyurethane. The body has a crown portion containing the running surface and two sidewalls joined to the crown portion via shoulder portions and ending in beads. Radially placed curved springs are situated so as to be circumferentially-spaced in specified distances from each other and extend from one bead to the other. The tire's beads are secured within the flange of a rim of a conventional vehicle wheel by tension as the beads are stretched to get over the flange of the rim during installation of the tire onto the rim. According to the invention, the curved springs are embedded in the tire body at least along the crown portion.

In one embodiment of the non-pneumatic tire of the present invention, the shape of the curved springs in the angular range of $0 \leq t \leq \pi$ from the one bead to the other can be described in an orthogonal coordinate system with axes X and Y by the equations $x = a \cdot \cos t$ and $y = b \cdot \sin t$. This shape is semi-elliptical, where the semi-ellipse falls inside the range determined by ellipses:

$$(7/8)a \geq b \geq (1/2)a$$

where:
a is the half of the large axis of the ellipse, and
b is the half of the small axis of the ellipse.
In the ideal case:

$$b = (2/3)a$$

The angle between the inwardly bent ends of the curved springs and the X axis of the orthogonal coordinate system, $\gamma$, is preferably a minimum of approximately 8°, or preferably it is equal to the angle between the wheel rim portion fitting to the bead of the tire and the rotational axis of the wheel rim.

The curved springs on the crown portion are surrounded by two high-strength, low-stretch belt inserts with good dynamic properties. The belts are built completely into the rubber and are positioned radially outside of the springs.

A second embodiment of the non-pneumatic tire of the present invention, suitable for use on two-piece, dismountable wheel rims, features a construction identical to the first embodiment except the belts are omitted and the ends of the curved springs feature, in side-view, a horizontally-oriented C-shape, where, in the nest formed by the C-shape, a bead-ring is embedded into the rubber body of the beads. The circular bead-ring is preferably made of high-strength steel, circularly bent, stranded spring steel wires embedded into rubber or KEVLAR fiber reinforced possibly by graphite or glass fibers.

In a third embodiment of the non-pneumatic tire of the present invention, a plurality of radially-extending and circumferentially-spaced compound-curve springs are at least partially embedded within the crown portion and the first and second sidewalls of the tire body, with each of the compound-curve springs having a first end terminating within the first bead of the tire body and a second end terminating within the second bead of the tire body. A circumferentially-extending belt constructed of a high-strength and low stretch material positioned radially outside of the plurality of curved springs so as to surround them.

The springs are constructed of a composite material and each spring includes a first sidewall that is generally S-shaped and a second sidewall that is generally inverted S-shaped. More specifically, the sidewalls of each spring each includes upper and lower sidewall portions with the upper sidewall portions convex with respect to a radial plane of the tire and the lower sidewall portions concave with respect to the radial plane of the tire. Each spring also includes a top portion that is convex with respect to the rim of the vehicle wheel and end portions that are flat so as to generally lay along a horizontal axis. A circumferentially-extending snubber is made of an elastic material and is adapted to engage the rim of the vehicle wheel so as to be enclosed by the body of the tire.

It is preferable that the surfaces of the curved springs be treated with some material facilitating adhesion, preferably with the two-component CHEMOSIL solution, or a copper covering may be applied to the curved spring surfaces. Furthermore, it is preferable to cover the curved springs under the running surface with a rubber-coated strengthening material, such as steel belting or KEVLAR fabric.

The vehicle tire according to the invention can be used advantageously with every vehicle having tires including trucks, military vehicles, cars, etc.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
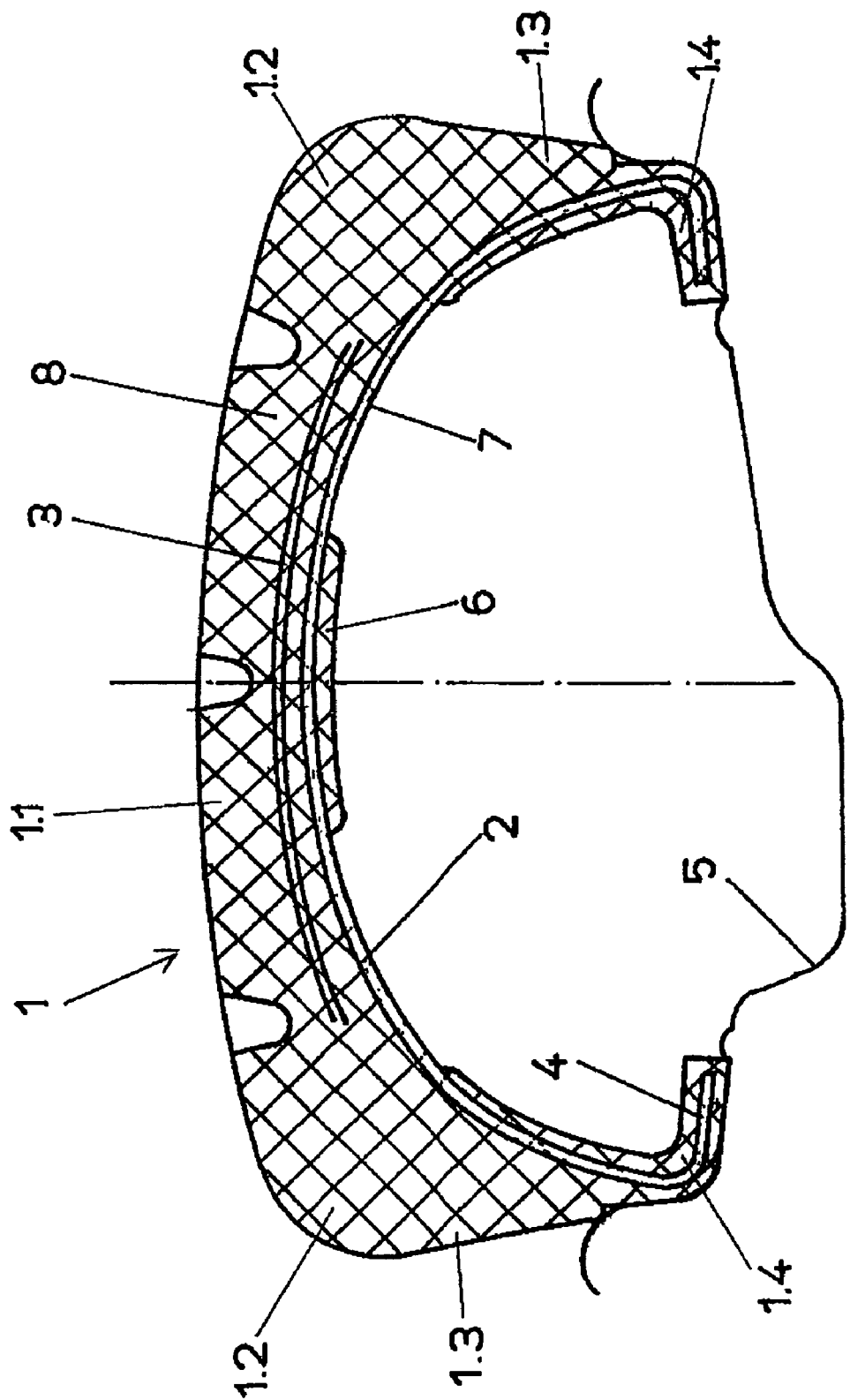
FIG. 1 is a cross-sectional view of a first embodiment of the vehicle tire of the present invention mounted on a one-piece wheel rim.

A first embodiment of the vehicle tire of the present invention is illustrated in cross-section in FIG. 1. The body, indicated in general at 1, is preferably made of an elastic material such as rubber or polyurethane (such as by dye-casting, transfer molding or injection molding). While the remainder of the specification will assume that the tire body material is rubber, it is to be understood that alternative materials may be used. The tire body 1 has a circumferentially-extending crown portion 1.1 provided with the running surface and two circumferentially-extending adjacent sidewalls 1.3 joined to the crown portion via shoulder portions 1.2 and ending in circumferentially-extending beads 1.4. The beads 1.4 of the vehicle tire are clamped into a one-piece wheel rim 5.

Figure 4:
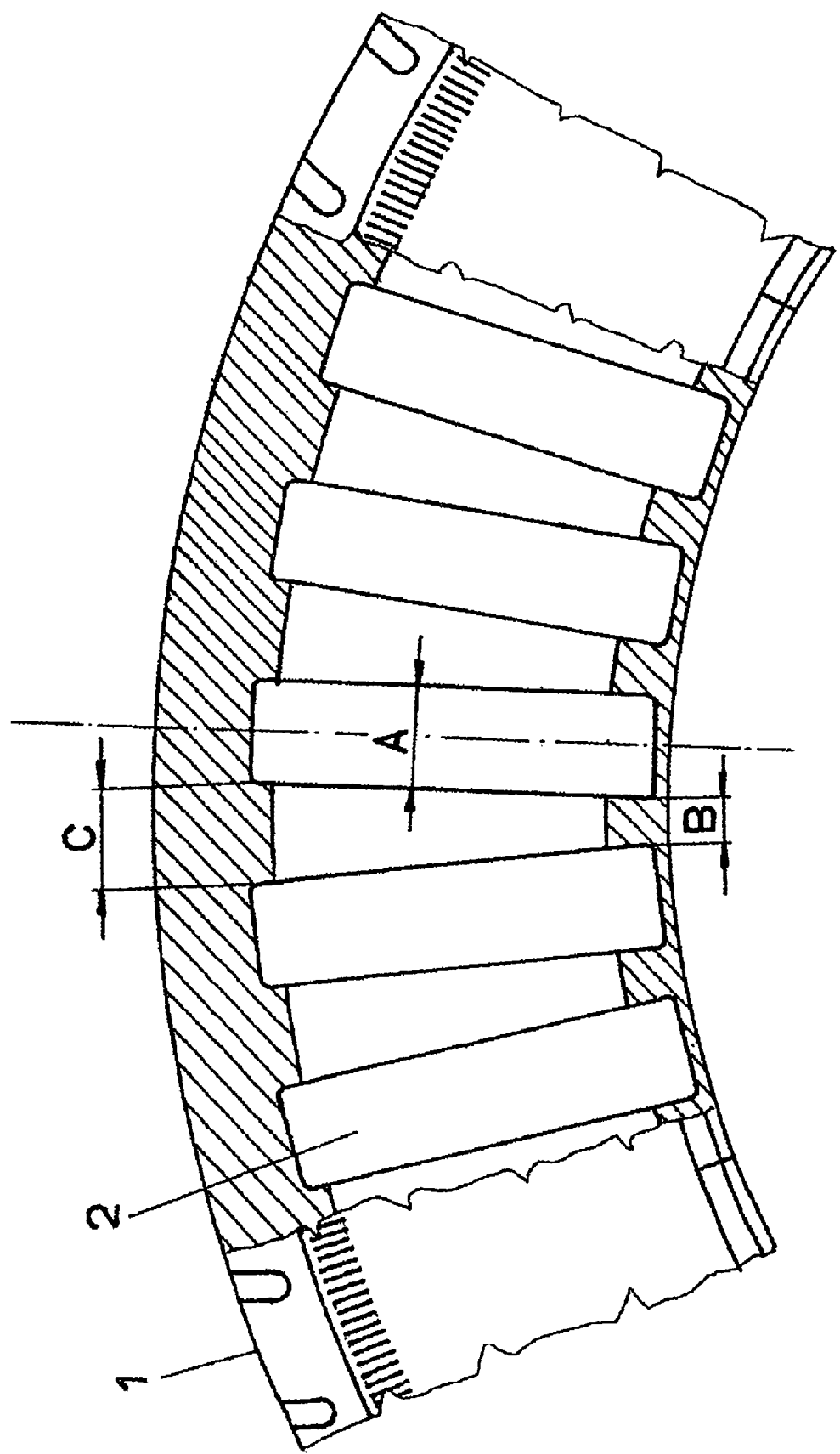
FIG. 4 is a cross-sectional view taken around the circumference of the tire of FIG. 1.
Figure 6:
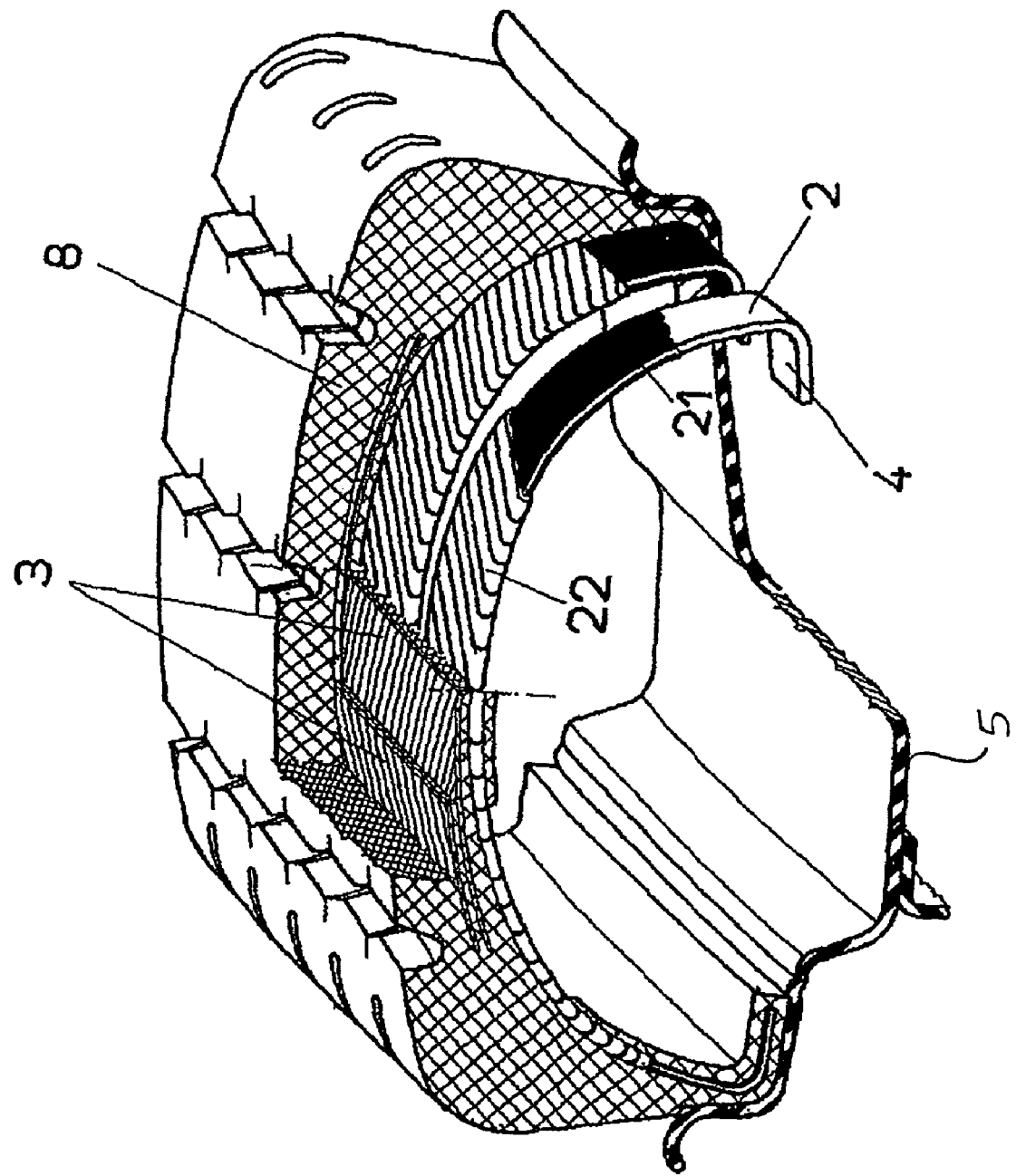
FIG. 6 is a perspective sectional view of the tire of FIG. 1.

As illustrated in FIGS. 1, 4 and 6, vehicle tire body 1 contains radially-extending curved springs 2. The material of curved springs 2 is preferably a thermoplastic matrix and glass fiber reinforcement composite, commonly known as fiber-reinforced plastic or fiberglass. The matrix is preferably poly-ethylene terephthalate (PET), also known as MYLAR film, or polyester. Other thermoplastics, epoxy, vinyl ester or other thermosets may also be used as a matrix material. As an alternative to the glass fiber, ZYLON fiber or KEVLAR fiber may be used. As an alternative to the composite construction, the curved springs may be made of single-layer or multi-layer spring steel, graphite or KEVLAR fiber with graphite or glass fiber reinforcements.

As illustrated in FIGS. 1 and 6, a pair of belt inserts 3 are embedded into the crown portion 1.1 above curved springs 2. The portion of the crown above the belts, indicated at 8 in FIG. 1, is provided with the tire tread pattern. Belts 3 should be constructed of a high-strength and low-stretch material. The material of the belts 3 is preferably steel but may alternatively be some high-strength rubbered fabric. Belts 3 may also alternatively be constructed from a fabric containing KEVLAR fiber or steel cords situated in an angle of minimum 10° to the circumferential axis of the crown portion 1.1. The KEVLAR fiber fabric allows the pre-stressed mounting of vehicle tire 1 on wheel rim 5. This hinders the slip of beads 1.4 on wheel rim 5 at higher traveling speeds by protecting against expansion due to high angular momentum and during braking. A rubber layer of a thickness of at least 1 mm should be between the belt insert and the curved springs.

As illustrated in FIGS. 1 and 6, the ends 4 of curved springs 2 are back folded. The back folded curved spring ends 4 rest against wheel rim 5. Grooves are provided on wheel rim 5 for this purpose.

Curved springs 2 preferably are covered by rubber at beads 1.4 and in the internal sides of sidewalls 1.3, and on the internal section 6 of crown portion 1.1. In order to ensure better heat conductivity, curved springs 2 may remain uncovered from below on the internal section 7 of shoulder portion 1.2. As will be described in greater detail below with respect to FIG. 6, curved springs 2 preferably are also coated with a material ensuring better metal-rubber adhesion (or composite or fiberglass-rubber adhesion if the springs are so made) in order to facilitate appropriate building into the rubber.

Figure 2:
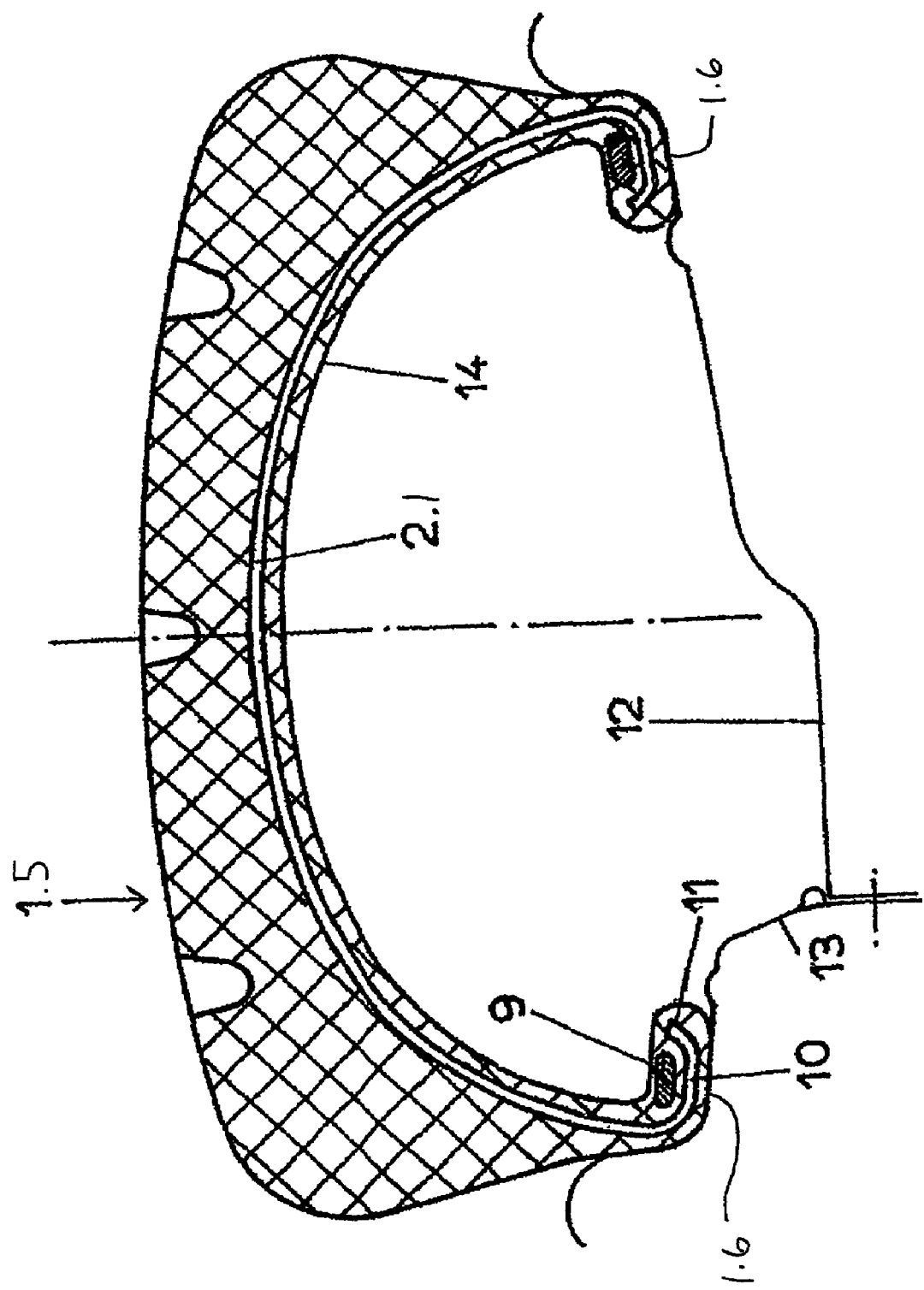
FIG. 2 is a cross-sectional view of a second embodiment of the vehicle tire of the present invention mounted on a two-piece wheel rim.

A second embodiment of the vehicle tire according to the present invention is illustrated in cross-section and indicated in general at 1.5 in FIG. 2. The second embodiment may be mounted on a one-piece or two-piece vehicle wheel rim, illustrated at 12 and 13. As illustrated in FIG. 2, the ends of curved springs 2.1 are bent into a lying (horizontal orientation) C-shape. Bead-rings 9 are positioned within both tire beads 1.6 and in the nest formed by the C-shaped spring ends. The bead-rings should be constructed from a high-strength and low stretch-material, preferably steel wire. The foot part 10 of back-folded curved springs 2.1 rest against the wheel rim and the upturned spring tips 11 prevent bead rings 9 from sliding out of beads 1.6. Bead rings 9 and curved springs 2.1 are all entirely embedded into the rubber of the tire. In the inside of vehicle tire 1.5, curved springs 2.1 are covered by a rubber layer 14 so that they are prevented from contacting air moisture. This prevents oxidation of the curved springs 2.1.

Figure 3:
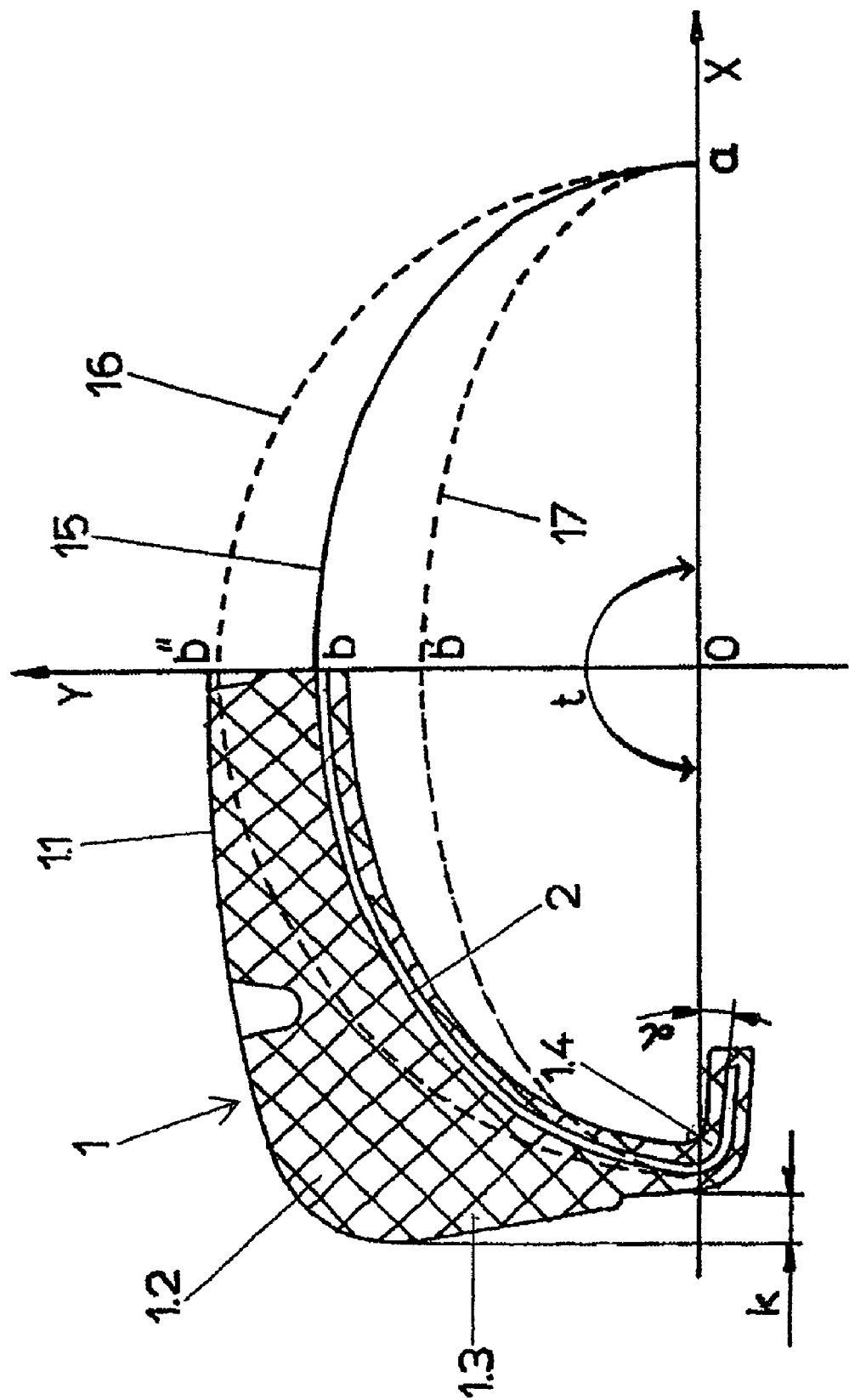
FIG. 3 is a diagram showing the shape of the curved springs of the tire of FIG. 1.

FIG. 3 shows the shape of curved springs 2 of FIG. 1 situated in the cross-section of the vehicle tire 1 in an orthogonal coordinate system with axes X and Y. The following comments for the springs 2 of FIG. 1 also apply to the springs 2.1 of FIG. 2. It is seen in FIG. 3 that point b defined on axis Y by the semi-ellipse 15, which describes the shape of curved spring 2, falls in the ideal case between points b' and b" where:

Point b' is defined on axis Y by semi-ellipse 17 satisfying the condition (b'=1/2·a), and Point b" is defined on axis Y by semi-ellipse 16 satisfying the condition (b"=7/8 ·a).

Semi-ellipses 15, 16 and 17 intercepting axis X at point a, where $2a$ is the large axis of the ellipses and $2b$, $2b'$ and $2b''$ are the small axes of the ellipses.

Thus the contour of curved spring 2 in the angular range of $0 \leq t \leq \pi(0\text{-}180°)$ corresponds to an ellipse defined in an orthogonal coordinate system with axes X and Y by equations $x = a \cdot \cos t$ and $y = b \cdot \sin t$ and satisfying the following conditions:

$$7/8 \cdot a \geq b \geq 1/2 \cdot a$$

where:

a is the half of the large axis of the ellipse, and b is the half of the small axis of the ellipse.

In the ideal case:

$$b = (2/3)a$$

In both the first and second embodiments of the vehicle tire of the present invention, as illustrated for the first embodiment in FIG. 3, the shoulder portion 1.2 of the vehicle tire 1 can be broader than the bead 1.4 of the vehicle tire 1 by a factor of k=2a/100·5 mm, where the distance between the beads 1.4 equals two-times the thickness of the rubber layer covering a single bead plus 2a.

The ends of curved springs 2 (and foot 10 of spring 2.1 in FIG. 2) are produced with a minimum of γ=8° break, as illustrated in FIG. 3. As a result, the angle between curved spring ends 4 and axis X (of foot 10 of spring 2.1 in FIGS. 2) is at least 8°.

The shock absorption of the vehicle tires of the first and second embodiments occurs due to the shape change of curved springs 2 or 2.1. Due to their semi-elliptical profiles, the shape change of the springs during load is distributed uniformly along the whole length of curved spring 2 or 2.1. In other words, no stress peaks occur which would lead to breaking. As a result, a dynamic life time similar or superior to that of conventional vehicle tires of radial or diagonal cord structure can be ensured.

The thin rubber layers covering bead portions 1.4 and 1.6 provide adhesion so as to hinder or prevent slippage of the beads 1.4 and 1.6 of the vehicle tires 1 and 1.5 on wheel rims 5 and 12, 13, respectively. The rubber layers do not play any role in the shock absorption of the vehicle tires.

FIG. 4 illustrates the arrangement of curved springs 2 in the vehicle tire 1. The following comments for the springs 2 and tire 1 of FIG. 1 also apply to the springs 2.1 and tire 1.5 of FIG. 2. The thickness of curved springs 2, their breadth A and circumferential spacing distance C measured at the crown portion 1.1 and distance B measured at bead 1.4 depend to a great extent on the size of vehicle tire 1, as well as on the properties expected from the vehicle tire 1. Considering the dynamic properties of rubber, distance C and dimension A should be a minimum of 10 mm each, whereas distance B should be a minimum of 2 mm. As an example, if the speed of a 15" diameter vehicle tire is approximately 95 mph and its load is approximately 880 lbs., for spring steel material with a thickness of 2 mm, the dimension A of the curved spring 2 should be a minimum of 20 mm and the distance between curved springs C should be a minimum 15 mm.

Figure 5:
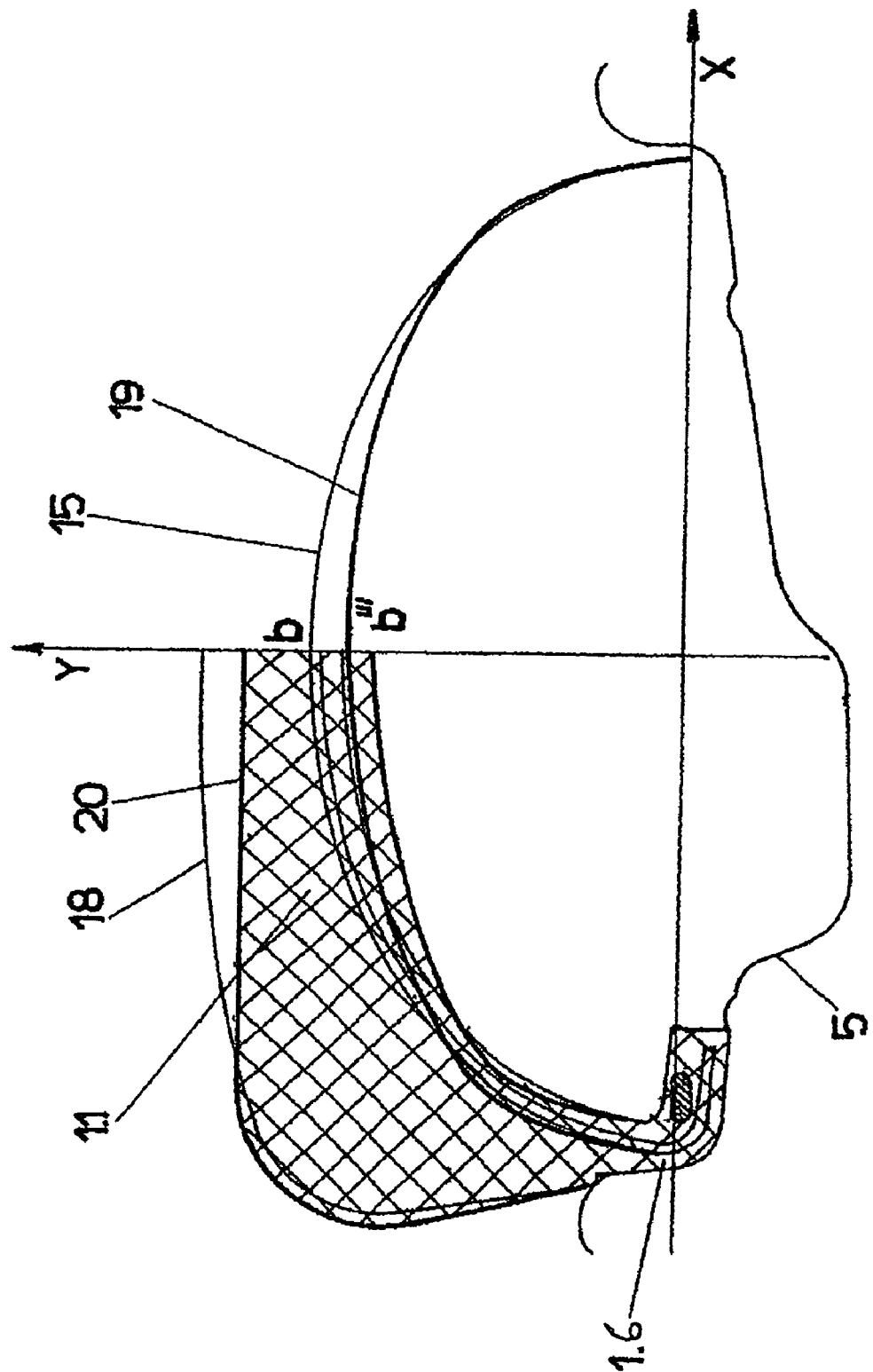
FIG. 5 is a diagram showing the shape of the curved springs of the tire of FIG. 2.

FIG. 5 shows the deformation of the rubber body and curved springs 2.1 in the vehicle tire 1.5 under load. The following comments for the springs 2.1 and tire 1.5 of FIG. 2 also apply to the springs 2 and tire 1 of FIG. 1. It can be seen in FIG. 5 that under load, the b dimension of the semi-elliptical curved spring 2.1 is deformed into the curvature 19 so that its height in the crown portion is reduced to dimension b''', whereas the position of the bead 1.6 of curved spring 2.1 remains unchanged. As a result, the convex surface 18 of the running surface is deformed to plane 20.

As illustrated in FIG. 6, the surfaces of curved springs 2 (of FIG. 1) preferably are treated with a two-component CHEMOSIL solution 21 in order to ensure better adherance to the rubber of the tire body. In addition, on the portions below the running surface, springs 2 are preferably covered by a strengthening material such as rubbered KEVLAR fiber fabric 22. The same may be said of the springs 2.1 of FIG. 2. Above or radially outside of curved springs 2, as described previously, belt inserts 3 are situated ensuring the adhesion of the vehicle tire 1 to wheel rim 5 during high speed travel.

Figure 7:
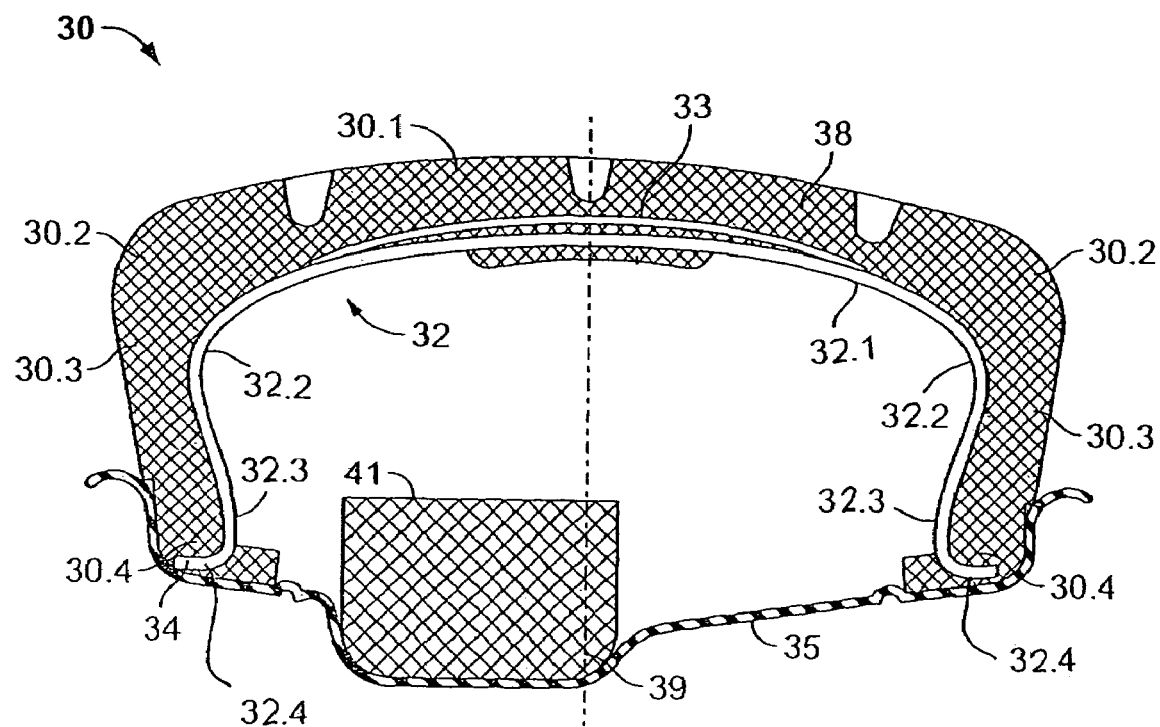
FIG. 7 is a cross-sectional view of a third embodiment of the vehicle tire of the present invention mounted on a one-piece wheel rim.
Figure 8:
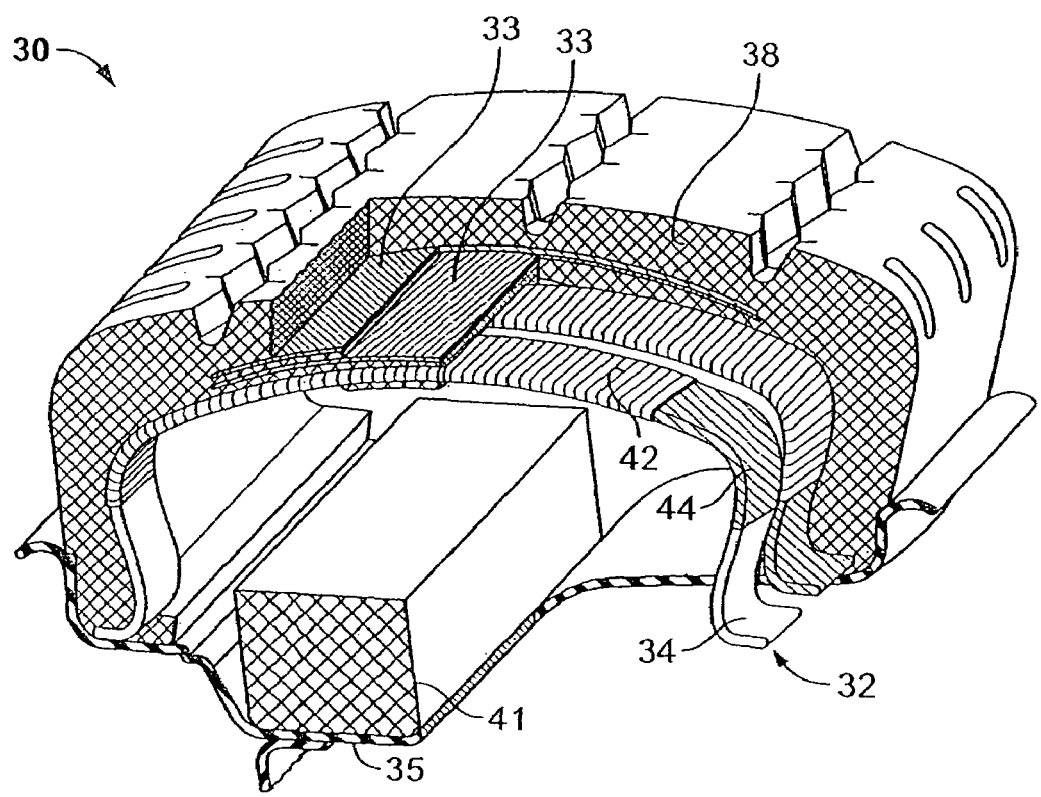
FIG. 8 is a perspective sectional view of the tire of FIG. 7 with an adhesive and strengthening material applied to the springs.

A third embodiment of the vehicle tire of the present invention is illustrated in FIGS. 7 and 8. As with the first and second embodiments, the body, indicated in general at 30, is preferably made of an elastic material such as rubber or polyurethane (such as by dye-casting, transfer molding or injection molding). The tire body 30 has a circumferentially-extending crown portion 30.1 provided with the running surface and two circumferentially-extending adjacent sidewalls 30.3 joined to the crown portion via shoulder portions 30.2 and ending in circumferentially-extending beads 30.4. The beads 30.4 of the vehicle tire are clamped into a one-piece wheel rim 35. While a one-piece rim is illustrated, the third embodiment of the tire of the present invention may be mounted on a two-piece wheel rim.

As indicated in general at 32 in FIGS. 7 and 8, vehicle tire body 30 contains radially-extending compound-curve springs 32. Each spring includes a crown or top portion 32.1, shoulder or upper sidewall portions 32.2, lower sidewall portions 32.3 and end portions 32.4. As illustrated in FIGS. 7 and 8, the top portion of the spring 32.1 is slightly convex with respect to the vehicle wheel rim 35. The upper sidewall portions of the spring 32.2 are convex outward with respect to the radial plane of the tire, indicated at 39 in FIG. 7. The lower sidewall portions of the spring 32.3 are concave inward with respect to the radial plane 39. As a result, the springs feature S-shaped and inverted S-shaped sidewalls. The ends of the spring 34 are generally flat so as to lay along a horizontal axis and bear on the flat section of the rim 35 to circumferentially distribute the load on the vehicle tires. The springs 32 are formed as continuous curves, with no circular or straight sections except the flat end, to avoid concentrations of stress in order to promote long fatigue life. The thickness and width of the springs may very, but may be, as an example only, 4 mm thick and 10 mm wide.

The beads of the tire 30.4 may optionally be provided with steel or composite bead rings, in the manner illustrated at 9 in FIG. 2. The ends 34 of the springs 32 engage the bead rings in such an embodiment.

The material of the compound-curve springs 32 is preferably a thermoplastic matrix and glass fiber reinforcement composite, commonly known as fiber-reinforced plastic or fiberglass. The matrix is preferably poly-ethylene terephthalate (PET), also known as MYLAR film, or polyester. Other thermoplastics, epoxy, vinyl ester or other thermosets may also be used as a matrix material. As an alternative to the glass fiber, ZYLON fiber or KEVLAR fiber may be used. As an alternative to the composite construction, the compound-curve springs 32 may be made of single-layer or multi-layer spring steel, graphite or KEVLAR fiber with graphite or glass fiber reinforcements.

The compound-curve springs are preferably manufactured by pultrusion with subsequent thermoforming. A peel ply textured film is preferably applied to the spring mold before thermoforming the spring. During thermoforming, the thermoplastic matrix material flows into the voids, cracks and cavities of the peel ply to avoid a glossy surface and raise the surface roughness to promote bonding with materials later applied to the surface of the spring.

The tire is preferably produced by transfer molding. As illustrated in FIG. 8, a CHEMLOK adhesive 44 is preferably applied to the spring surface before the transfer molding and permits the rubber to vulcanize directly onto the surface of the spring to provide a bond strength higher than the tear strength of the rubber to avoid adhesive failure. In addition, on the portions below the running surface, springs 32 are preferably covered by a strengthening material such as steel belting or rubbered KEVLAR fiber fabric 42.

As illustrated in FIGS. 7 and 8, the tire preferably includes a ring-shaped snubber 41 that is positioned on the rim 35 so as to surround it circumferentially. The snubber may be constructed of any elastomer or rubber but preferably is constructed from a thermoplastic foam, such as polyethylene foam. The snubber protects the springs 32 from deforming beyond their elastic limit in the event that the vehicle encounters a road hazard or becomes overloaded.

As with the first embodiment, the third embodiment of the tire of the present invention preferably includes a pair of belt inserts 33 embedded into the crown portion 30.1 of the tire above compound-curve springs 32. The portion of the crown above the belts, indicated at 38 in FIG. 7, is provided with the tire tread pattern. Belts 33 should be constructed of a high-strength and low-stretch material. The material of the belts 33 is preferably steel but may alternatively be some high-strength rubbered fabric. Belts 33 may also alternatively be constructed from a fabric containing KEVLAR fiber or steel cords situated in an angle of minimum 10° to the circumferential axis of the crown portion 30.1. A rubber layer of a thickness of at least 2 mm should be between the belt insert and the curved springs. The belts 33 help to ensure the adhesion of the vehicle tire 30 to wheel rim 35 during high speed travel.

The arrangement of the curved springs in the vehicle tire 30 of the third embodiment may also be described with reference to FIG. 4. The thickness of the compound-curve springs 32, their breadth A and circumferential spacing distance C measured at the crown portion 30.1 and distance B measured at bead 30.4 depend to a great extent on the size of vehicle tire 30, as well as on the properties expected from the vehicle tire 30. Considering the dynamic properties of rubber, distance C and dimension A should be a minimum of 10 mm each, whereas distance B should be a minimum of 2 mm.

Significant advantages of the vehicle tires according to the invention include:

Total safety in the event of punctures, since the vehicle tire does not have internal pressure, thus no air can escape which would deteriorate traveling properties.

The manufacturing process is well automatable and the production quality is reliable.

No monitoring/control of tire air pressure is necessary and there is no need for a spare tire.

The energy requirement of the manufacturing of the vehicle tire according to the invention is generally lower as compared to conventional tires. As a result, less environmental harm is caused.

Lower rolling resistance and superior fuel efficiency than a pneumatic tire.

While the preferred embodiments of the invention have been shown and described, it will be apparent to those skilled in the art that changes and modifications may be made therein without departing from the spirit of the invention, the scope of which is defined by the appended claims.

What is claimed is:

1. A non-pneumatic tire for a vehicle comprising:
   a. a body made of an elastic material and having a circumferentially-extending crown portion featuring a running surface and circumferentially-extending first and second sidewalk joined to said crown portion, said circumferentially-extending first and second side walls terminating in circumferentially-extending first and second beads, respectively, said first and second beads adapted to be secured within a flange of a rim of a vehicle wheel; and
   b. a plurality of radially-extending and circumferential-spaced compound-curve springs at least partially embedded within said crown portion and said first and second sidewalls of the tire body, each of said compound-curve springs having a first end portion, the first end portion being embedded within the first bead of the tire body, a second end portion, the second end portion being embedded within the second bead of the tire body, a first sidewall that is generally S-shaped and a second sidewall that is generally inverted S-shaped;
   wherein the sidewalls of each spring each include upper and lower sidewall portions with the upper sidewall portions being convex with respect to a radial plane of the tire and the lower sidewall portions being concave with respect to the radial plane of the tire.

2. The non-pneumatic tire of claim 1 further comprising a circumferentially-extending belt positioned radially outside of, and surrounding, the plurality of curved springs.

3. The non-pneumatic tire of claim 2 wherein said belt is constructed of steel.

4. The non-pneumatic tire of claim 2 wherein said belt is constructed of fiber-reinforced fabric.

5. The non-pneumatic tire of claim 1 wherein the springs are constructed of a composite material.

6. The non-pneumatic tire of claim 5 wherein the composite material of the springs is a thermoplastic matrix and glass fiber reinforcement composite.

7. The non-pneumatic tire of claim 1 wherein the springs are constructed of steel.

8. The non-pneumatic tire of claim 1 wherein each spring includes a top portion that is convex with respect to the rim of the vehicle wheel.

9. The non-pneumatic fire of claim 1 wherein the first and second ends of each spring are flat so as to generally lay along a horizontal axis.

10. The non-pneumatic tire of claim 1 further comprising a circumferentially-extending snubber made or an elastic material adapted to engage the rim of the vehicle wheel and be enclosed by the body of the tire.

11. The non-pneumatic tire of claim 1 wherein surfaces of the compound-curve springs are treated to enhance adhesion of the springs to the body of the tire.

12. The non-pneumatic tire of claim 1 further comprising a circumferentially-extending snubber made of an elastic material adapted to engage the rim of the vehicle wheel so as to be enclosed by the body of the tire.

13. The non-pneumatic tire of claim 5 wherein the composite material is a thermoset matrix with a fiber reinforcement material.

14. A non-pneumatic tire for a vehicle comprising:

a. a body made of an elastic material and having a circumferentially-extending crown portion featuring a running surface and circumferentially-extending first and second sidewalks joined to said crown portion, said circumferentially-extending first and second side walls terminating in circumferentially-extending first and second beads, respectively, said first and second beads adapted to be secured within a flange of a rim of a vehicle wheel; and b. a plurality of radially-extending and circumferentially-spaced compound-curve springs at least partially embedded within said crown portion and said first and second sidewalls of the tire body, each of said compound-curve springs having a first end portion that extends axially within the first bead of the tire body, a second end portion that extends axially within the second bead of the tire body, a first sidewall that is generally S-shape and a second sidewall that is generally inverted S-shaped;

wherein the sidewall of each spring each include upper and lower sidewall portions with the upper sidewall portions being convex with respect to a radial plane of the tire and the lower sidewall portions being concave with respect to the radial plane of the tire.

* * * * *